United States Patent Office 3,121,665
Patented Feb. 18, 1964

3,121,665
ANTI-INFECTIOUS MATERIALS FROM YEAST
Ivan A. Parfentjev, 870 7th Ave., New York, N.Y.
No Drawing. Filed May 3, 1962, Ser. No. 192,284
14 Claims. (Cl. 167—65)

This invention relates to a method of producing new anti-infectious yeast extracts which possess germicidal properties, and which are effective in giving protection against bacterial and fungal infections.

This application is a continuation-in-part of Serial No. 441,183, filed July 2, 1954, now abandoned, and also Serial No. 526,057, filed August 2, 1955.

Broadly, the invention involves contacting yeast with a mild alkaline solution until an anti-infectious extract is obtained and thereafter separating the extract from the residual yeast solids.

More specifically, the invention involves contacting yeast, or a yeast slurry, with an alkaline solution having a pH between about 8–10 at ambient temperatures for at least about 24 hours and thereafter separating the residual yeast solids from the resulting solution containing the anti-infectious yeast extract.

The principal feature of this invention resides in the discovery that a valuable anti-infectious material is extracted from yeast when yeast, or a yeast slurry, is contacted with a mild alkaline solution for an appreciable period of time. Therefore, although the claims recite the optimum conditions for carrying out the mild alkaline treatment of the yeast, that is, contacting yeast with an alkaline solution having a pH from about 8–10 at ambient temperatures for a period of at least 24 hours, it is understood that the claims cover any substantially equivalent mild alkaline treatment.

For example, the pH of the alkaline solution could be anywhere from about 8 up to even 11, or the temperature could be anywhere from about 5° up to even 75° C., or the time could be reduced to as little as 8 hours. The main consideration is that the alkaline treatment should be mild. Advantageously, if the pH is at the upper range of around 10–11, the temperature is preferably maintained at around 25° C. or lower. Although an alkali treatment of the yeast for at least 24 hours is considered as being optimum conditions, it is understood that at least some anti-infectious yeast material will be extracted from the yeast even after as short a time as 8 hours. In order to achieve maximum efficiency, however, when the alkaline solution is at ambient temperatures, and the pH is in the range of about 8–10, the alkali treatment is preferably carried on for at least 24 hours, particularly so when the pH is low, i.e., pH 8.

Separating the yeast extract from the residual yeast solids can be carried out by any suitable method commonly used for separating solids from solutions, i.e., filtering, centrifuging, decanting, etc. When the yeast is subjected to the mild alkaline treatment according to this invention, the anti-infectious yeast material is extracted and is soluble in neutral and alkaline solutions. The yeast cell residue therefore can advantageously be separated from the yeast extract by simply filtering off the residual yeast solids while the yeast extract is in solution at neutral or alkaline pH.

After the residual yeast material has been separated from the anti-infectious yeast extract, the remaining solution containing the extract can be used alone or in conjunction with a suitable surface active agent and employed as a germicidal agent. Alternatively, the solution containing the extract can be subjected to isoelectric precipitation so as to obtain various fractions of the yeast extract. Other suitable well-known methods of separating proteinaceous materials from the solution can also be employed.

With respect to the isoelectric precipitation method, after separating the residual yeast cell solids from the solution containing the yeast extract, the pH of the solution can be reduced to pH 5 by the addition of HCl or other suitable acid. At this pH, a precipitate is formed. This precipitate can be separated and redissolved in water at a pH of 7 or above to form a solution which is effective as a germicidal agent. More acid can then be added to the solution remaining after removing the precipitate which came out at pH 5. As the pH is thereby lowered, more and more of the anti-infectious proteinaceous yeast extract precipitates out until at pH 2 substantially all the extract is precipitated. This precipitated yeast extract can then be separated away from the solution and redissolved in water at a pH of 7 or above to form a solution which is effective as a germicidal agent. This solution can be sterilized and adjusted to a neutral pH and then injected into animals and humans in the treatment of various bacterial or fungal infections.

A further fraction of the yeast extract can be obtained by adding alcohol to the neutral solution containing a redissolved extract prepared as described above so that a 70% alcohol solution is obtained. The precipitate which forms when the concentration of the alcohol reaches about 70% is separated away and the yeast extract remaining in the alcohol solution can be separated from the alcohol by distilling off the alcohol or by acidifying the alcohol solution until the extract precipitates out. The extract is then redissolved in water at a neutral pH and the resulting solution is effective as an antibiotic.

The particular yeasts which have thus far been employed in this invention are those which are being specifically claimed, i.e., bakers' yeast and brewers' yeast. It would be expected that other yeasts of the same type or family could also be used according to this invention and that they would therefore be equivalent to those actually being claimed.

A modification of the alkali treatment process described above involves first treating the yeast with toluene and ether to kill the yeast cells before subjecting the yeast to the alkaline treatment. Such a modification reduces the solubility of the anti-infectious yeast extract. The extract, for example, is insoluble at neutral pH, but still can be employed as a germicidal agent in the form of a suspension. Since the solubility of the extract has been lowered by the prior toluene and ether treatment, it is advantageous, after the alkaline treatment step, to separate out the yeast cell solids while the pH of solution containing the extract is about 9–10. It has been found, however, that the solubility of the yeast extract is not substantially affected if the toluene-ether treatment is carried out after the alkali treatment step.

A further modification of the process described above involves removing fatty material from the yeast by treating the yeast with an organic solvent prior to the alkaline treatment step.

It has also been found than an anti-infectious material from beer can be produced by precipitating the anti-infectious material from the beer by acidifying the beer to bring the pH to about 2.5 and separating the resulting anti-infectious precipitate from the beer.

*Example 1*

To 8 pounds of pressed bakers' yeast cake containing live yeast there is added 8 liters of water and the resulting mixture is well shaken. The alkalinity of the mixture is then adjusted to pH 10 by gradual addition of 10 N sodium hydroxide. The material is maintained at room temperature at this pH for about 24 hours to extract the anti-infectious material. At the end of this time, the solution is filtered from the residue of the yeast cells by the use of filter paper. The filtrate is designated "fraction A solution." This filtrate is acidified with hydrochloric acid to bring the pH down to about 5. The precipitate which is formed at this pH is filtered off and designated fraction B. After fraction B is filtered off, the filtrate is further acidified with hydrochloric acid to bring the pH down to about 2 and the precipitate which is formed at pH 2 is filtered off and designated fraction C. Fraction B and fraction C are then separately redissolved in water at pH 7 to form "fraction B solution" and "fraction C solution." To a portion of "fraction C solution" a sufficient amount of alcohol is added to form a 70% alcohol solution. The precipitate which is formed is filtered away and the remaining alcohol solution is acidified with hydrochloric acid to a pH of 2. The resulting precipitate is filtered off and designated fraction D. Fraction D is then redissolved in water at pH 7 to form "fraction D solution."

Fractions A, B, C, and D solutions are all found to have germicidal properties. Any of these fractions can be advantageously combined with any suitable non-protein-precipitatable surface active agent to product an effective germicidal material. The surface active agent enhances the penetration powers of the yeast extract. Ionic as well as non-ionic surface active agents which do not precipitate the protein of the yeast can be used.

Fractions A, B, C, and D solutions can also be advantageously mixed with perfumes, preservatives, soothing, cooling and pain-alleviating ingredients, such as benzocaine, menthol, camphor, calamine, etc.

*Example 2*

Yeast sludge from the fermentation of beer and containing about 15% of yeast material (dry basis) is subjected to extraction by the addition of caustic soda for a period of two days, the addition of caustic soda being sufficient to maintain the pH between pH 8 and pH 9 on the first day, and at pH 10 on the second day. During this period of extraction, the mixture is agitated or stirred from time to time. After two days' extraction, the material is left over night to settle and the next day the supernatant liquid is siphoned off from the settled extracted yeast. If the liquid is not sufficiently clear, it can be clarified by filtration or centrifuging, and the filtration can be aided by the addition of a material such as Filter-Cel (neutral diatomaceous earth). A somewhat increased recovery of liquid can be obtained by filtering the entire mixture.

Yeast extracts are readily obtained as above described, containing around 0.5 to 1.0% anti-infectious proteinaceous fraction to form a new germicidal composition. And such a solution can advantageously be used directly by admixture with soap solution in forming the new composition.

Where a composition more concentrated in anti-infectious proteinaceous fraction is desired, the solution can be treated to precipitate the proteinaceous fraction by concentrated ammonium sulfate or by acidification to pH 2–3, or by other protein precipitants, and the fraction thus obtained redissolved in water to give a more concentrated solution than that from which the yeast fraction was precipitated.

An advantageous composition has been prepared by admixing the yeast extract produced as described in the above example with 40% soap solution, such as a liquid cocoanut oil soap solution, in the proportions of 75% of the yeast extract and 25% of the soap solution. This gives a composition containing about 10% of soap and around 0.5 to 0.7% of the proteinaceous yeast fraction. An antiseptic or preservative is advantageously added, such as merthiolate, in amount sufficient to give 1 part in 10,000 in the final composition. A salt of lauryl sulfonic acid can be used as the soap solution.

The above composition has been found effective in the treatment of skin diseases. It has proved particularly effective in the treatment of skin diseases of animals such as dogs and cats.

*Example 3*

To 8 pounds of pressed bakers' yeast cake containing live yeast there is added 1 liter of water to form a heavy paste, and to it is added 320 cc. of ether and 80 cc. of toluene to kill the yeast cells. The yeast cells can also be killed by other means.

After incubation of the mixture for about 2 to 3 hours at ordinary temperatures, 7 liters of water are added and the material well shaken. The alkalinity is then adjusted to pH 10 by gradual addition of 10 N sodium hydroxide. For the amount of yeast and water used, about 100 sodium is required to bring the pH to 10. The material is maintained at room temperature at this pH for about 24 hours to extract the anti-infectious material. At the end of this time, the solution is filtered from the residue of the yeast cells by the use of filter paper. This filtering step is important, since the active material is in a rather fine colloidal stage, such that it might be lost by the addition of filter aids or heavy filter pads. But by the use of filter paper, it is possible to obtain by filtration a transparent filtrate rich in active anti-infectious material.

The pH of the filtrate can then be reduced to 7, 6, 5, 4, 3 or 2 and the precipitate formed at any point can be resuspended in saline solution to yield valuable germicidal agents. The precipitates which come out generally at the lower pH range are predominantly fungicidal in character.

The precipitate which comes down at pH 7 is resuspended in a saline solution containing 17% to 20% solids. This suspension is further diluted, e.g., 1:50 or 1:100, and when 1 cc. of the diluted material is injected into mice, the mice are protected against a lethal dose of Proteus. Solutions of this germicidal yeast extract were also useful in the treatment of *Brucella abortus* in mice, *Candida albicans* in mice, and *H. pertussis* (whooping cough) infection in mice. A germicidal extract which precipitated out of pH 2 inhibits the development of the fungus causing athlete's foot on agar plates in a medium on which the fungus otherwise flourishes.

*Example 4*

Two pounds of pressed bakers' yeast cake were extracted twice, each time with two liters of acetone, to which 2 cc. of hydrochloric acid were added. After removal of the second portion of acetone, the residue of yeast was extracted with 2 liters of water containing 30 cc of 10 N NaOH, the pH of the extracting fluid being about 10. After incubation at room temperature over night, the material was filtered and the filtrate acidified to pH 3.5. The precipitate thus formed was collected and suspended in 200 cc. of water. At neutrality, this defatted proteinaceous material dissolves completely. The material contains about 4.5% solids.

Tests on animals shows that this material had anti-infectious properties and protected the animals. Given in 2 doses of 0.5 cc. each intraperitoneally, 24 and 48 hours before lethal doses of 3 billion cells of live Proteus, the material showed high protection.

*Example 5*

Twelve pounds of yeast were mixed with 3 liters of toluene and the mixture left at room temperature for several hours, with resulting fermentation of the live yeast and breaking down of the yeast cells. At the end of this period, 6 liters of water were added and the pH adjusted to slightly alkaline, about pH 8, and the material was kept over night in a cold room. At the end of this time, the material was filtered to separate the aqueous extract from the residue of yeast cells.

The method of filtering the solution is important to avoid loss of anti-infectious material, and the use of filter aid or Filter-Cell (neutral diatomaceous earth) is omitted. And the material was filtered on heavy paper and the filtrate returned several times until a quite clear liquid filtrate was obtained.

To this liquid was added ammonium sulfate to give a concentration of 30% ammonium sulfate in the liquid. This resulted in the precipitation of a proteinaceous anti-infectious fraction from the solution and after several hours this precipitate was filtered from the remaining solution which contained constituents soluble in this concentration of ammonium sulfate.

This precipitate containing anti-infectious material was dialyzed to free it from ammonium sulfate and from water soluble constituents. And after this dialysis and purification, the material was ready for suspension in saline solution and for injection.

A suspension of this anti-infectious material, when injected into mice in the manner above described, gave protection against excessive lethal doses of Proteus.

In all of the products above described, the proteinaceous or protein-carrying anti-infectious material is free from water-soluble extractive ingredients of the yeast which are soluble at pH 3, including vitamins and growth-promoting substances which are thus removed from the anti-infectious material.

The new anti-infectious material can also be produced from brewers' yeast. The following examples illustrate such preparation.

Example 6

The yeast used was the upper layer containing vital yeast cells left as a residue after 7 days of fermentation of beer. The wet yeast was suspended in an equal weight of water, and the reaction adjusted and maintained for 24 hours at pH 10 by the addition of sodium hydroxide. No toluene or ether was added in this example. After 24 hours, the material was filtered. A portion of the filtrate was acidified to pH 3 with hydrochloric acid and resulting formation of a precipitate. The precipitate formed was collected and redissolved in a small amount of water at pH 7. The yeast treated in this case had not been defatted by extraction with organic solvents, but the product was soluble in water at pH 7.

Another portion of the alkaline filtrate was neutralized to pH 7, no precipitate being formed, and ammonium sulfate was then added to give a solution containing 30% ammonium sulfate. This resulted in the formation of a precipitate which was filtered from the solution and dialyzed against water to free it from ammonium sulfate. This precipitate was soluble when a small amount of water was added to it at pH 7.

The precipitates formed by acidifying to pH 3, and by precipitation of the ammonium sulfate, were both soluble in small amounts of water at pH 7. And these soluble products were obtained without the preliminary extraction of the yeast with organic solvents to remove fatty material.

Aqueous neutral solutions are thus obtainable containing e.g. around 10% to 20% of the protein carrying materials which have similar anti-infectious properties to those previously described.

The products above described were made from the yeast of lager beer. Similar products were made in a similar way from ale yeast.

The protective and anti-infectious properties of these products were shown by injecting mice intraperitoneally with a solution containing 1 and 2 mg. respectively of the proteinaceous material dissolved in saline solution in the proportions of 1 mg. of proteinaceous material for 0.2 cc. of saline solution. 24 hours after the mice were thus injected, they were inoculated with 4 billion Proteus organisms. The control mice were injected with a corresponding volume of saline solution and later with the Proteus organisms.

Of the control mice, injected, only 3 of the 18 survived. Of 30 mice injected with 2 mg. of the protein-bearing material derived from the yeast of lager beer, 27 survived. Of the 5 mice treated with the product obtained from ale yeast, all five survived.

Of the 6 mice injected with 1 mg. of the protein-bearing material derived from lager beer yeast, 5 of the 6 survived.

The solutions used for injecting were made by diluting the more concentrated solution containing around 10% to 25% of protein-bearing material at pH 7 to a dilution of about 0.5% (e.g. 1 mg. in 0.2 cc. saline solution).

I have subjected such a solution containing about 0.5% protein (5 mg. protein per ml.) to boiling at neutrality for 3 minutes to determine whether the proteinaceous material was precipitated. Only a very small trace of the proteinaceous material was coagulated, and this was centrifuged out. The greatest part of the protein was found noncoagulable by heat and, when tested on mice in the proportions above indicated, all 6 of the mice treated survived, while only 2 of the control mice without teratment survived out of 12 mice treated.

Example 7

The brewers' yeast used was the bottom layer remaining after 8 days of fermentation and made up for the main part of dead yeast cells. This yeast was extracted by admixing with water in about equal proportions to the weight of the wet yeast and adding sodium hydroxide solution to bring the pH to 10. After standing for 24 hours, the material was filtered and the filtrate neutralized by the addition of hydrochloric acid to bring the pH to 7. The solution in this case was a dilute solution containing 0.76% of protein.

Tests were made on mice by injecting 1 mg. of the proteinaceous material in 0.2 cc. saline solution intraperitoneally and 24 hours later injecting the mice by intraperitoneally injection with 3 billion live cells of Proteus. 5 of the 6 mice treated survived, while only 2 of the 12 control mice treated survived.

It is well known that during the fermentation of yeast, there is formed an amorphous precipitate called trub. When the yeast slurry is treated according to the process of this invention, the anti-infectious extract is derived from the trub as well as from the yeast cells themselves. Although the trub can be readily separated from the slurry by means of a vibrating screen, it is usually advantageous to subject the entire yeast slurry to alkaline treatment. The trub itself, however, can be separated and subjected to alkaline treatment to obtain the anti-infectious material in a much shorter time than with yeast itself.

Example 8

A portion of the filtrate produced as described in the preceding example by extraction at pH 10 was acidified with hydrochloric acid to reduce the pH to 3. The fine proteinaceous precipitate formed could not be readily filtered through filter paper. But on adding acetone in the proportions of 1200 cc. of acetone to 1800 cc. of the filtrate, the precipitate was readily filtered through filter paper. The precipitate thus filtered out was dried with acetone, followed by ether. The dry material thus produced was soluble in water at pH 7.

Tests were made of this material on mice by injecting each mouse with 1 mg. of the proteinaceous material in 0.2 cc. saline solution intraperitoneally and 24 hours later the mice were treated by intraperitoneal injection of 3 billion live cells of Proteus. 5 of the 6 mice treated survived, while only 2 of the 12 control mice treated survived.

Example 9

A portion of the filtrate produced as described in Example 7 was salted out by saturation with dry ammonium sulfate to produce a 30% ammonium sulfate solution.

This resulted in the separation of a precipitate which was separated from the solution and freed from ammonium sulfate by dialysis. The material was soluble at pH 7 and contained 1.58% protein.

This material was used to treat mice in the manner described in the preceding example, and all 6 of the infected mice survived when so treated, while only 2 out of 12 of the control mice survived.

*Example 10*

The brewers' yeast used was the same bottom yeast referred to in Example 7 and remaining after 8 days of fermentation and made up for the main part of dead yeast cells. The yeast was extracted by admixing with water as described in Example 7 and adding sodium hydroxide solution to bring the pH to 10. And after standing for 24 hours, the material was filtered and the solution was neutralized to pH 7 by adding hydrochloric acid.

To 4 liters of the resulting solution, there was added 4 grams of sodium sulfite as a reducing agent. The solution contained 0.66% protein.

Tests were made on mice as described in Example 7, and all 6 of the infected mice treated with the material survived, while only 2 of the 12 control mice survived.

Examples 7 to 10 describe the treatment of brewers' yeast, including both the upper live yeast layer and the bottom layer made up mainly of dead yeast cells. And all of these examples describe the extraction of the yeast at pH 10 without prior defatting of the yeast and without the prior addition of ether and toluene, as described in Example 3. The anti-infectious fraction of the brewers' yeast was extracted by this procedure and gave a solution which an neutralizing to pH 7 contained the anti-infectious fraction in solution. On acidifying the solution to pH 3, or by precipitation with 30% ammonium sulfate, the anti-infectious material was precipitated out; and the precipitate formed with ammonium sulfate was dialyzed to free it from ammonium sulfate. The precipitated anti-infectious material was soluble in water at pH 7 and was effective in protecting mice against lethal doses of Proteus organisms.

In Example 8, the anti-infectious material was produced in dry form by precipitation with acetone followed by drying with acetone and ether. This solid material was similarly soluble in water at pH 7.

I have similarly tried bakers' yeast without defatting, as described in Example 4, and without the addition of ether and toluene as described in Example 3 to kill the yeast cells. And I have found that when bakers' yeast is so treated by extraction with water at pH 10, the anti-infectious fraction is obtained in a form which is similarly soluble at pH 7, but precipitated at pH 3, or by 30% ammonium sulfate solution, it gives precipitates which are soluble in water at pH 7. Solutions so obtained are similarly effective in protecting mice against lethal doses of Proteus organisms.

I am led to believe that the preliminary treatment of the yeast with ether and toluene as described in Example 3 modifies the protein-bearing fraction containing the anti-infectious material to convert it into a form which is insoluble at pH 7 and soluble at pH 10. When this preliminary treatment with ether and toluene is omitted, the anti-infectious material is similarly precipitated at pH 3 or by 30% ammonium sulfate solution, but is soluble at pH 7.

I have also found that an anti-infectious material can be produced from beer which contains minute amounts of the protein-bearing anti-infectious material in solution.

*Example 11*

Lager beer, after 8 days' fermentation, was acidified with hydrochloric acid to bring the pH to 3. This resulted in the precipitation of soluble protein contained in the beer, but this precipitate was in an exceedingly finely divided form, not readily filterable, but in a form which is absorbed by Filter-Cel. Filter-Cel was added to the acidified beer, and the Filter-Cel with the protein adsorbed on it was removed from the beer by filtration. The beer was then neutralized by the addition of caustic soda to bring it to its normal pH.

The Filter-Cel containing the adsorbed protein was eluted in water at neutrality, and the resulting solution was found to possess anti-infectious properties.

The beer before acidification was filtered to free it from yeast cells. Acidification of the filtered beer at pH 3 gave a faint precipitate which was adsorbed with Filter-Cel when Filter-Cel was added in the proportions of 100 grams per 2½ liters of the filtered beer. On extraction of the precipitated Filter-Cel with 100 cc. of water, with an alkaline reaction of pH 10, and neutralizing the solution to pH 7, the solution contained 0.4% protein or about 0.4 grams of the protein to 2½ liters of filtered beer.

The anti-infectious protein fraction thus obtained was used for treating mice, each mouse receiving 1 mg. of protein in 0.2 cc. saline solution intraperitoneally. 24 hours later, the mice were treated by intraperitoneal injection of 3 billion live cells of Proteus. 5 of the 6 mice treated survived, while only 2 of the 12 control mice survived.

The anti-infectious protein-bearing material thus obtained from beer is soluble at pH 7 and is precipitated at about pH 2.5–3 or salted out by ammonium sulfate. The precipitate, after dialyzing to remove ammonium sulfate if precipitated in ammonium sulfate, is soluble in water at pH 7.

Instead of using Filter-Cel, other absorbent materials can be used such as alumina, silica, resins, etc.

Other beers can be similarly treated for the production of anti-infectious material therefrom, including ale beer, and also yeast beer, i.e. the beer or fermentation liquid produced in the growing of bakers' yeast, and remaining after the separation of the yeast therefrom. Wine yeast also can be treated so as to produce the anti-infectious material.

The anti-infectious materials or fractions of yeast produced by the different examples are all protein-bearing anti-infectious materials which are soluble in water at pH 10 and are precipitated from water solution at about pH 2.5–3 or by 30% ammonium sulfate solution or other. The products of all of the examples except Example 3 are soluble in water at pH 7. The modified product of Example 3 is soluble at pH 10 but insoluble at pH 7 and is a product having the advantage of being usable in suspension to give a slower and delayed action on injection. The neutral solutions produced according to the other examples are directly usable for injection.

These products can be further purified and separated into fractions by partial and progressive acidification of the solution obtained at about pH 7, by adding successive amounts of acid to reduce the acidity progressively, e.g., from pH 10 to pH 9, pH 8, pH 7, pH 6, pH 5, pH 4 and pH 3, and with separate removal of precipitates thrown down at such successive pH values, and by bringing the precipitate back to a neutral suspension or solution.

Or the precipitate formed by acidifying the original solution to precipitate the active material therefrom at a pH of around 2.5 to 3 can be selectively dissolved by adding water and bringing the pH successively to e.g. pH 4, pH 5, pH 6 and pH 7, and separating the successive fractions thus dissolved from the remaining undissolved portion.

Different fractions of anti-infectious material can thus be obtained, which differ somewhat in their activity.

Solutions of the anti-infectious materials are readily prepared with a concentration of around 10% to 20% of protein-bearing anti-infectious material. And these concentrated solutions can be used in some cases or can be diluted to give a more dilute solution for injection.

The solutions are advantageously sterilized, which can be accomplished by heating to the boiling point for a short time and removing any minor amounts of protein which may be precipitated in this way. The solutions can also be sterilized by pasteurizing or by adding a compatible sterilizing material.

When the anti-infectious material is obtained by extraction and precipitation by acidification to about pH 2.5 to 3, the soluble components which remain soluble at that acid strength are removed from the precipitate. By removing such soluble constituents, the anti-infectious material is freed from vitamins and growth promoting substances which are soluble at that acid pH.

The presence of such soluble constituents is unobjectionable in many cases or may even be advantageous. And when the anti-infectious material is obtained by extraction at pH 10 followed by neutralization to pH 7, the solution will contain such soluble constituents in addition to the soluble protein-bearing anti-infectious fraction.

I claim:

1. The method of producing an anti-infectious material from yeast which comprises contacting yeast with a mild alkaline solution having a pH of about 8 to 10 for at least about twenty-four hours at ambient temperatures so as to form a solution containing such anti-infectious, proteinaceous matreial, and separating the resulting solution from the remaining yeast solids.

2. The process of claim 1 in which the solution containing the anti-infectious proteinaceous material is neutralized after it has been separated from the remaining yeast solids.

3. The process of claim 1 in which the solution containing the anti-infectious material is neutralized before it has been separated from the remaining yeast solids.

4. The method of claim 1 in which an acid is added to the solution containing the anti-infectious proteinaceous material and the resulting precipitate is separated from the solution.

5. The method of claim 4 in which the precipitate is redissolved in a neutral aqueous solution.

6. The method of claim 5 in which a sufficient amount of alcohol is added to the solution containing the redissolved precipitate to form an approximately 70% alcohol solution and separating the resulting precipitate, thereby leaving an alcohol solution containing an anti-infectious yeast extract having antibiotic properties, and thereafter separating the alcohol from the yeast extract having the antibiotic properties.

7. The anti-infectious material produced in accordance with the process of claim 1.

8. The method of producing an anti-infectious material from yeast which comprises extracting the yeast which is a member of the group consisting of bakers' yeast and brewers' yeast by contacting the yeast in an aqueous solution having a pH of about 8-10 for at least about 24 hours at ambient temperatures to form a solution containing such anti-infectious, proteinaceous material, and separating the resulting solution from the extracted yeast.

9. The method of producing an anti-infectious material from yeast which is a member of the group consisting of bakers' yeast and brewers' yeast which comprises killing the yeast cells with an organic solvent, contacting the killed yeast with an aqueous alkaline solution having a pH between about 8 and 10 for at least about 24 hours at ambient temperatures to form a solution containing such anti-infectious material, separating the resulting solution from the extracted yeast, and neutralizing the resulting solution to precipitate said anti-infectious material.

10. The method of producing an anti-infectious material from yeast which is a member of the group consisting of bakers' yeast and brewers' yeast which comprises treating the yeast with an organic solvent to remove the fatty material and extracting the yeast in an aqueous alkaline solution having a pH between about 8 and 10 for at least about 24 hours at ambient temperatures to form a solution containing such anti-infectious material.

11. The method of producing an anti-infectious material from beer after fermentation which comprises precipitating the anti-infectious material from the beer by acidifying the beer to bring the pH to about 2.5 and separating the resulting anti-infectious precipitate from the beer.

12. A composition comprising the anti-infectious material of claim 3 in combination with a non-protein precipitating surface active agent.

13. The composition of claim 12 in which a preservative is present.

14. The composition of claim 12 containing from 5% to 20% surface active agent and from 0.1% to 1% of anti-infectious material.

References Cited in the file of this patent

FOREIGN PATENTS 979,406     France _____ Apr. 26, 1951